US012810506B2

(12) United States Patent
Lee et al.

(10) Patent No.: US 12,810,506 B2
(45) Date of Patent: Nov. 24, 2026

(54) METHOD OF TRAINING VECTOR IMAGE GENERATOR MODEL

(71) Applicant: Samsung Electronics Co., Ltd., Suwon-si (KR)

(72) Inventors: Sooyong Lee, Suwon-si (KR); Tackgeun You, Seoul-si (KR); Bohyung Han, Seoul-si (KR); Bongkeun Kim, Suwon-si (KR); Yeojin Na, Suwon-si (KR); Seongtae Jeong, Suwon-si (KR)

(73) Assignees: Samsung Electronics Co., Ltd., Suwon-si (KR); SEOUL NATIONAL UNIVERSITY R&DB FOUNDATION, Suwon-si (KR)

( * ) Notice: Subject to any disclaimer, the term of this patent is extended or adjusted under 35 U.S.C. 154(b) by 50 days.

(21) Appl. No.: 18/829,728

(22) Filed: Sep. 10, 2024

(65) Prior Publication Data

US 2025/0265753 A1 Aug. 21, 2025

(30) Foreign Application Priority Data

Feb. 15, 2024 (KR) ........................ 10-2024-0022001

(51) Int. Cl.
*G06T 11/60* (2026.01)
*G06N 3/09* (2023.01)
(Continued)

(52) U.S. Cl.
CPC ................ *G06T 11/60* (2013.01); *G06T 3/40* (2013.01); *G06T 3/60* (2013.01)

(58) Field of Classification Search
CPC ......... G06T 3/40; G06T 3/60; G06T 5/00–08; G06T 5/40; G06T 11/60; G06T 2207/10024; G06T 2207/20081; G06T 2207/20084; G06T 19/00; G06V 40/16; G06V 40/166; G06V 20/00; G06V 20/10; G06V 10/50; G06V 10/56; G06V 10/774;
(Continued)

(56) References Cited

U.S. PATENT DOCUMENTS 11,461,661 B2 10/2022 Baker
11,532,173 B2 * 12/2022 Batra ........................ G06T 9/00
(Continued)

FOREIGN PATENT DOCUMENTS

CN 115587909 A 1/2023

OTHER PUBLICATIONS

Cao et al., "SVGformer: Representation Learning for Continuous Vector Graphics using Transformers", 2023, Adobe Research, Inc, pp. 10092-100102. (Year: 2023).*
Diederik P. Kingma et al., "Auto-Encoding Variational Bayes," International Conference on Learning Representation (ICLR) Dec. 10, 2013.
(Continued)

*Primary Examiner* — Wesner Sajous
(74) *Attorney, Agent, or Firm* — Fish & Richardson P.C.

(57) ABSTRACT

A vector image generator model training method includes receiving a vector image, transforming a raw image that is the received vector image, and generating an augmented image, and outputting the vector image by using a vector image generator model, based on the raw image and the augmented image. The vector image generator model includes a neural network model, and the vector image generator model is configured to output the raw image when the raw image and the augmented image are input.

20 Claims, 12 Drawing Sheets

(51) Int. Cl.
*G06T 3/40* (2024.01)
*G06T 3/60* (2024.01)
*G06V 10/82* (2022.01)

(58) Field of Classification Search
CPC ...... G06V 10/776; G06V 10/82; H04N 23/88; G06F 18/00; G06F 18/214; G06N 20/00; G06N 3/08; G06N 3/045; G06N 3/0475
See application file for complete search history.

(56) References Cited

U.S. PATENT DOCUMENTS

| | | | | |
|---|---|---|---|---|
| 11,558,593 | B2 * | 1/2023 | Caron | G06V 10/56 |
| 11,769,056 | B2 | 9/2023 | Banerjee et al. | |
| 2020/0242507 | A1 | 7/2020 | Gan et al. | |
| 2020/0320439 | A1 | 10/2020 | Lee | |
| 2022/0374658 | A1 | 11/2022 | Chen et al. | |
| 2022/0414959 | A1 * | 12/2022 | Peng | G06V 10/774 |
| 2023/0015117 | A1 * | 1/2023 | Aberman | G06T 5/77 |
| 2023/0298326 | A1 | 9/2023 | Wang et al. | |
| 2025/0078335 | A1 * | 3/2025 | Cho | G06N 20/00 |

OTHER PUBLICATIONS

Leo Sampaio Ferraz Ribeiro et al., "Sketchformer: Transformer-based Representation for Sketched Structure," International Conference on Computer Vision and Pattern Recognition (CVPR), Feb. 24, 2020.
Alexandre Carlier et al., "DeepSVG: A Hierarchical Generative Network for Vector Graphics Animation," International Conference on Neural Information Systems (NeurIPS), Jul. 22, 2020.
Defu Cao, et al., "SVGformer: Representation Learning for Continuous Vector Graphics using Transformers," International Conference on Computer Vision and Pattern Recognition (CVPR), Jun. 17, 2023.
Yizhi Wang et al., "DeepVecFont: Synthesizing High-quality Vector Fonts via Dual-modality Learning," ACM SIGGRAPH Conference and Exhibition on Computer Graphics and Interactive Techniques in Asia (SIGGRAPH Asia), vol. 1, No. 1, Oct. 13, 2021.
Yuqing Wang et al., "DeepVecFont-v2: Exploiting Transformers to Synthesize Vector Fonts with Higher Quality," International Conference on Computer Vision and Pattern Recognition (CVPR), Mar. 25, 2023.
Martin Heusel et al., "GANs Trained by a Two Time-Scale Update Rule Converge to a Local Nash Equilibrium," International Conference on Neural Information Systems (NeurIPS), Jun. 26, 2017.

* cited by examiner

| pos | command type | arguments | | | | | |
|---|---|---|---|---|---|---|---|
| | | control 1 | | control 2 | | point | |
| 0 | 0 (SOS) | – | – | – | – | – | – |
| 1 | 1 (Move) | – | – | – | – | 13.2 | 3.0 |
| 2 | | . . . | | | | | |
| 3 | 2 (line) | – | – | – | – | 16.5 | 18.9 |
| 4 | 2 (line) | – | – | – | – | 16.2 | 21.0 |
| 5 | | . . . | | | | | |
| 6 | 3 (Curve) | 5.8 | 19.1 | 6.3 | 17.5 | 7.2 | 16.2 |
| 7 | | . . . | | | | | |
| 8 | 4 (EOS) | – | – | – | – | – | – |

| pos | command type | arguments | | | | | |
|---|---|---|---|---|---|---|---|
| | | control 1 | | control 2 | | point | |
| 0 | 0 (SOS) | – | – | – | – | – | – |
| 1 | 1 (Move) | – | – | – | – | 13.2 | 3.0 |
| 2 | | . . . | | | | | |
| 3 | 2 (line) | – | – | – | – | 16.5 | 18.9 |
| 4 | 2 (line) | – | – | – | – | 16.2 | 21.0 |
| 5 | | . . . | | | | | |
| 6 | 3 (Curve) | 5.8 | 19.1 | 6.3 | 17.5 | 7.2 | 16.2 |
| 7 | | . . . | | | | | |
| 8 | 4 (EOS) | – | – | – | – | – | – |

METHOD OF TRAINING VECTOR IMAGE GENERATOR MODEL

CROSS-REFERENCE TO RELATED APPLICATION

This application is based on and claims priority under 35 U.S.C. § 119 to Korean Patent Application No. 10-2024-0022001, filed on Feb. 15, 2024, in the Korean Intellectual Property Office, the disclosure of which is incorporated by reference herein in its entirety.

BACKGROUND

The inventive concepts relate to a method of training a vector image generator model; and more particularly, to a vector image generator model training method using a neural network model.

Recently, with the development of neural network technologies, a method of modeling a vector image generator model by using a neural network has been proposed. However, a drawback of the neural network improperly determining a multiple correct answer can occur in a process of modeling the vector image generator model, because vector images may express the same image in various methods.

SUMMARY

The inventive concepts provide a vector image generator model training method that solves a drawback of a multiple correct answer.

Also, a task to be solved by the technical idea of the inventive concepts is not limited to the task mentioned above, and other tasks can be clearly understood by those skilled in the art from the description below.

According to an aspect of the inventive concepts, there is provided a vector image generator model training method including receiving an image; generating an augmented image by transforming a raw image included in the received image; inputting at least one of the raw image or the augmented image into the vector image generator model; and outputting a vector image using the vector image generator model, the vector image output by the vector image generator model based on the raw image and the augmented image, wherein the vector image generator model comprises a neural network model, and wherein the vector image generator model is configured to output the raw image as the vector image output from the vector image generator model when the raw image and the augmented image are input to the vector image generator model.

According to another aspect of the inventive concepts, there is provided a vector image generator model training method including receiving an image; transforming a format of the received image and generating a raw image that is a vector image; transforming the raw image and generating an augmented image; inputting at least one of the raw image or the augmented image into the vector image generator model; and outputting the vector image using the vector image generator model, the vector image output by the vector image generator model based on the raw image and the augmented image, wherein the vector image generator model comprises a neural network model, and wherein the vector image generator model is configured to output the raw image as the vector image output from the vector image generator model when the raw image and the augmented image are input to the vector image generator model.

According to a further aspect of the inventive concepts, there is provided a vector image generator model training method including receiving an image; generating an augmented image by transforming a raw image included in the received image; inputting input data to the vector image generator model, the input data including at least one of the raw image or the augmented image; and outputting a vector image using the vector image generator model, the vector image output by the vector image generator model based on the raw image and the augmented image, wherein the vector image generator model comprises a neural network model, wherein the vector image generator model is configured to output the raw image from the vector image generator model as the vector image when the raw image and the augmented image are input to the vector image generator model, and wherein the input data input to the vector image generator model is labeled.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
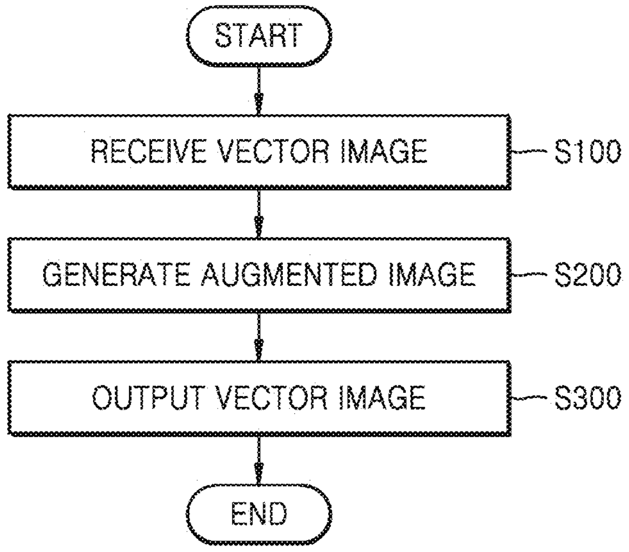
FIG. 1 is a flowchart illustrating a vector image generator model training method according to at least one embodiment.

Embodiments are described below in detail with reference to the accompanying drawings. The same reference numerals are used for the same components in the drawings, and repeated descriptions thereof are omitted. In the drawings below, a thickness and size of each layer may be exaggerated for convenience and clarity of explanation, and may therefore differ somewhat from the actual shape and proportion.

Figure 2:
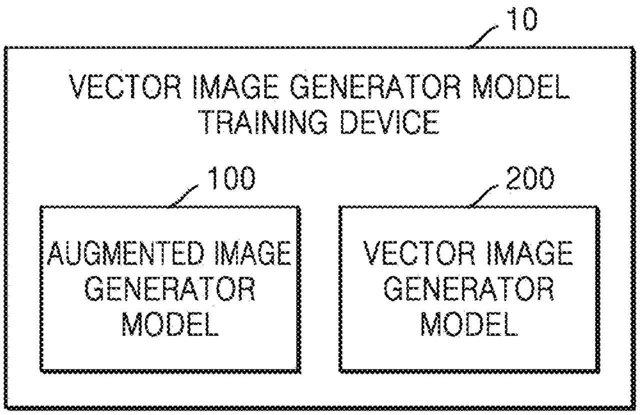
FIG. 2 is a schematic diagram illustrating a vector image generator model training device according to at least one embodiment.

FIG. 1 is a flowchart illustrating a vector image generator model training method according to at least one embodiment. FIG. 2 is a schematic diagram illustrating a vector image generator model training device according to at least one embodiment.

Referring to FIGS. 1 and 2, a vector image generator model training device 10 may include an augmented image generator model 100 and a vector image generator model 200. In at least one embodiment, the vector image generator model training device 10 may include a neural network model; and/or the vector image generator model training device 10 may include a deep learning model. The vector image generator model training device 10 may include a variational autoencoder. For example, the vector image generator model 200 may include a neural network model. For example, the vector image generator model 200 may include a deep learning model. For example, the vector image generator model 200 may include a variational autoencoder. A method of training the vector image generator model 200, based on the augmented image generator model 100, is described below.

In FIG. 2, the augmented image generator model 100 and the vector image generator model 200 are illustrated as separate models as examples. However, according to at least one embodiment, the vector image generator model 200 may also be configured to generate an augmented image. That is, the vector image generator model 200 may include the augmented image generator model 100. In another embodiment, the augmented image generator model 100 and/or the vector image generator model 200 may include a plurality of models.

First, the vector image generator model training device 10 may receive a vector image in operation S100. For example, the augmented image generator model 100 may receive a vector image. In at least one embodiment, different components (e.g., additional components) of the vector image generator model training device 10 may receive a vector image. In FIGS. 1 and 2, a case where the vector image generator model training device 10 receives a vector image matching a vector image format required by the vector image generator model 200 in operation S100 is described as an example. A case where the vector image generator model training device 10 receives an image not matching the vector image format required by the vector image generator model 200 is described with reference to FIGS. 9 to 11.

An image may have various formats. For example, the image may have a vector image format and/or a raster graphics format. The vector image format may express an image by using a vector that is a mathematical function, and the raster graphics format may express an image by using a pixel grid.

The vector image may include a shape and a path. Also, the vector image may include properties (opacity, outline, and/or transformation). Also, the vector image may include grouping and overlapping. Also, the vector image may include a text. Also, the vector image may include a pattern and a gradation.

For example, the vector image format may include Graphic Data System (GDS), Adobe Illustrator (AI), Scalable Vector Graphics (SVG), Vector Markup Language (VML), Computer Graphics Metafile (CGM), Gerber formats, and/or the like.

For example, the raster graphics format may include Joint Photographic Experts Group (JPEG), Graphics Interchange Format (GIF), Portable Network Graphics (PNG), Tag Image File Format (TIFF), Microsoft Windows Device Independent Bitmap (BMP), and High Resolution Image Download MS PowerPoint Slide (HEIF), Better Portable Graphics (BPG), Raw formats, and/or the like. Also, the image may include a complex format such as Portable Document Format (PDF) and/or Encapsulated Postscript (EPS).

Thereafter, the augmented image generator model 100 may generate an augmented image of the vector image in operation S200. The augmented image generator model 100 may be configured to transform the input vector image and generate the augmented image. The augmented image generator model 100 may generate a plurality of augmented images, based on various types of transformations.

Here, the vector image input to the augmented image generator model 100 may be referred to as a first image, and an augmented image of the first image may be referred to as a second image. Also, the first image may be referred to as a raw image, and the second image may be referred to as an augmented image. That is, the augmented image may be generated, based on the raw image.

A case where the vector image has the SVG format is described below as an example. However, the inventive concepts are not limited to this, and it is undoubted that the vector image may include various formats.

The first image may have, for example, the SVG format. The SVG format may include a format used to express two-dimensional vector graphics. Compared to the raster graphics format, the SVG format is independent of a resolution, and may freely enlarge and/or reduce sizes. Since the first image has the SVG format, the second image may also have the SVG format. A method of transforming the first image is described with reference to FIGS. 3 to 5.

Figure 3:
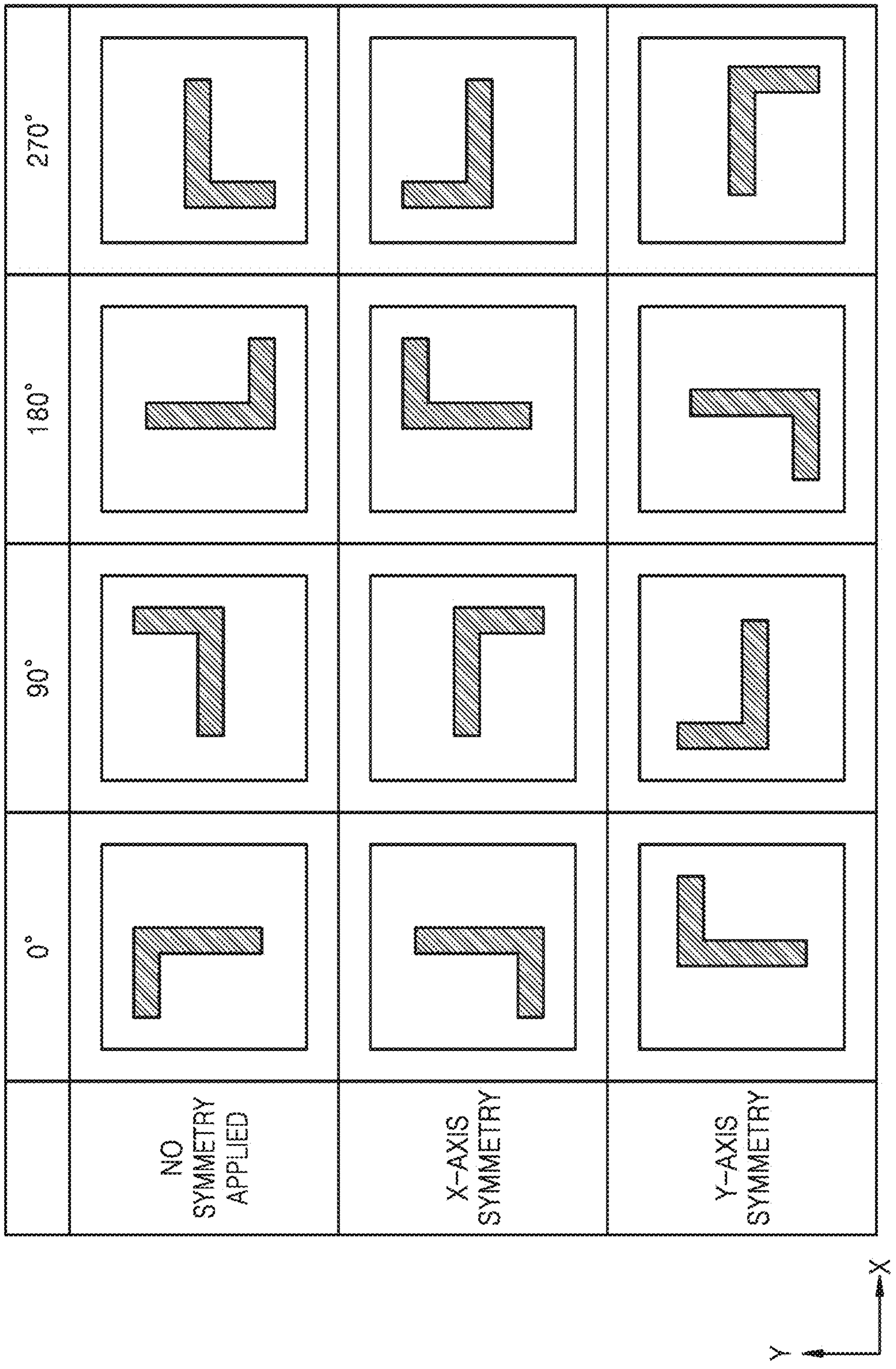
FIG. 3 is a diagram illustrating transformations according to at least one embodiment.
Figure 4:
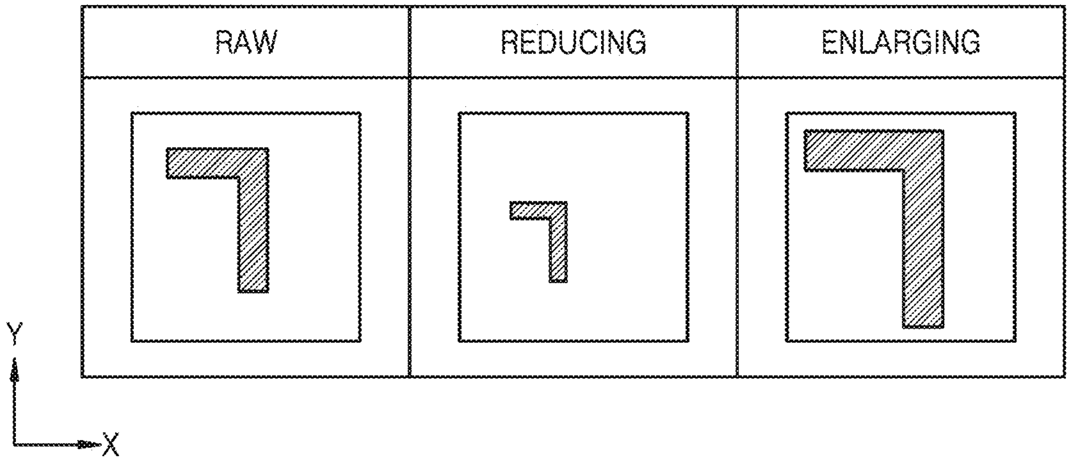
FIG. 4 is a diagram illustrating transformations according to at least one embodiment.
Figure 5:
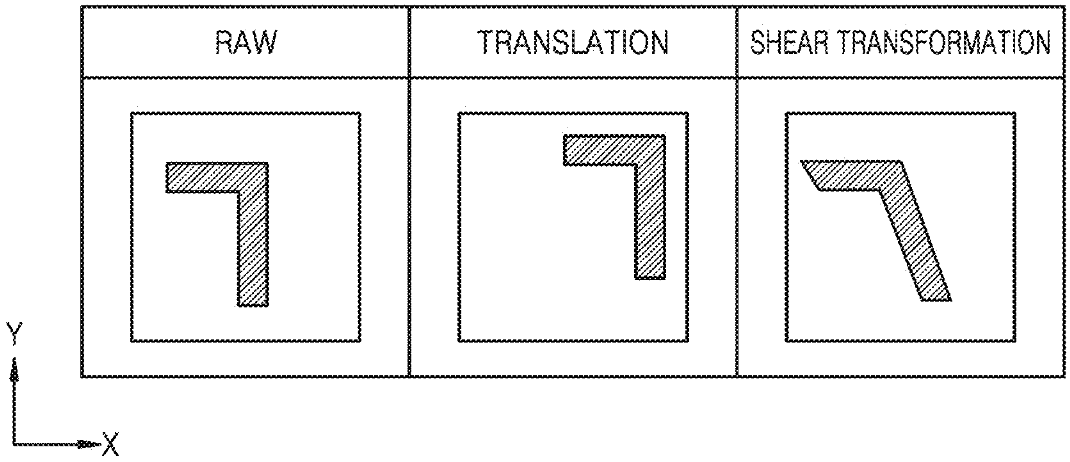
FIG. 5 is a diagram illustrating transformations according to at least one embodiment.

FIGS. 3 to 5 are diagrams illustrating transformations according to at least one embodiment. FIG. 3 illustrates rotation transformation and symmetry transformation, FIG. 4 illustrates size transformation, and FIG. 5 illustrates translation and shear transformation. FIGS. 3 to 5 illustrate an example in which a first image has a "7"-shaped shape (a line shape extending in a first horizontal direction (X direction) and a line shape extending in a second horizontal direction (Y direction)). However, this is an example, and the image of the inventive concepts is not limited to this, and it is undoubted that images having various shapes may be transformed.

Referring to FIGS. 3 to 5, a second image may be generated by transforming a first image. In FIG. 3, the first image may include an image to which no symmetry is applied and no rotation transformation is performed, and the second image may include all of a plurality of images other than the first image. Also, in FIGS. 4 and 5, the first image may include a raw image, and the second image may include all of a plurality of images other than the raw image.

Here, the transformation may include rotation transformation, symmetry transformation, and/or a combination of rotation transformation and symmetry transformation. The rotation transformation may include, for example, 90° rotation transformation, 180° rotation transformation, and 270° rotation transformation. The symmetry transformation may include X-axis symmetry transformation and Y-axis symmetry transformation. Therefore, the transformation may include, for example, 90° rotation transformation, 180° rotation transformation, 270° rotation transformation, X-axis symmetry transformation, Y-axis symmetry transformation, a combination of X-axis symmetry transformation and 90° rotation transformation, a combination of X-axis symmetry transformation and 180° rotation transformation, a combination of X-axis symmetry transformation and 270° rotation transformation, a combination of Y-axis symmetry transformation and 90° rotation transformation, a combination of Y-axis symmetry transformation and 180° rotation transformation, and a combination of Y-axis symmetry transformation and 270° rotation transformation.

Also, the transformation may include translation. The translation may include transformation moving in a direction parallel to an X axis, transformation moving in a direction parallel to a Y axis, and/or transformation moving in a direction diagonal to the X axis and Y axis. Also, the transformation may include enlarging and/or reducing the size of an image. The transformation may include shear transformation that tilts the image along one axis.

In this specification, a direction parallel to a main surface of an image may be defined as a horizontal direction (X direction and/or Y direction), and a direction vertical to the horizontal direction (X direction and/or Y direction) may be defined as a vertical direction (Z direction).

Returning to FIGS. 1 and 2 again, after generating the augmented image in operation S200, the vector image generator model 200 may output the vector image in operation S300. Here, the vector image generator model 200 may be configured to output a raw image. That is, the vector image generator model 200 may be trained to output the raw image from the vector image generator model 200, when the raw image and a plurality of augmented images are input to the vector image generator model 200. As described above, the vector image generator model 200 may include a neural network model. The vector image generator model 200 may include a deep learning model. For example, the vector image generator model 200 may include a variational autoencoder.

The variational autoencoder is a probabilistic model variant of an autoencoder and may include an autoencoder-based generator model that generates new data following the distribution of learning data. The variational autoencoder may be configured to use a variational method to find an ideal probability distribution, and the variational method may include a method of, when it is difficult to directly calculate a function in a question of finding the extremum of the function, substituting the function with another computable function and obtaining an approximate solution. The vector image generator model 200 may include an encoder, a variational autoencoder, and a decoder. The encoder, the variational autoencoder, and the decoder are described in more detail with reference to FIGS. 6 to 8.

When the first image and/or the second image are input to the vector image generator model 200, each of the first image and/or the second image may be input in a labeled state to the vector image generator model 200. That is, each of the first image and/or the second image may be input to the vector image generator model 200 in a state of including label data. Here, that the image is labeled may mean that the image includes the label data about the image. The label data may include an annotation and/or tag including information about the image. For example, the information may include whether the image is raw and/or a method of transforming the image.

The vector image generator model training device 10 may train the vector image generator model 200 in a self-supervised learning method. However, the vector image generator model training device 10 may train the vector image generator model 200 in a self-supervised learning method that uses label data. That is, the vector image generator model 200 may be trained in the self-supervised learning method. However, the vector image generator model 200 may be trained in the self-supervised learning method that uses the label data.

As described above, the first image may include a raw image, and the second image may include an augmented image transformed from the raw image. For example, when the first image is input to the vector image generator model 200, information that the first image includes the raw image may be input to the vector image generator model 200, together. Also, when the second image is input to the vector image generator model 200, information that the second image includes an augmented image rather than the raw image and a transformation method may be input to the vector image generator model 200, together.

The vector image generator model 200 may be configured to output the first image regardless of the inputting of the first image and the second image. That is, when the first image is input to the vector image generator model 200, the first image may be output from the vector image generator model 200, and even when the second image is input to the vector image generator model 200, the first image may be output from the vector image generator model 200. When the vector image generator model 200 is trained to output the raw image from the vector image generator model 200 although which of the raw image and the augmented image is input to the vector image generator model 200, the vector image generator model 200 may learn the relationship between a plurality of augmented images. The operation of training the vector image generator model 200 may include the operation of updating a latent vector.

In general, a vector image may express one image in various ways. Therefore, when the vector image generator model 200 is trained based on the vector image, there is a risk of a drawback of a multiple correct answer occurs.

In the vector image generator model training method of the inventive concepts, the vector image generator model 200 may be learned based on a first image that is a raw image and a second image that is a transformed image. In more detail, when the first image and the second image are input to the vector image generator model 200, the vector image generator model 200 may be trained to output the first image from the vector image generator model 200. Therefore, the vector image generator model 200 may be trained to recognize when an image has been transformed, the type of transformation, and/or how to reverse a transformation.

The vector image generator model 200 may be trained (or learned) with more data, based on data generated from the augmented image generator model 100, thereby improving the performance of the vector image generator model 200 and solving a drawback of the multiple correct answer. Also, the vector image generator model training method of the inventive concepts may include inputting a labeled vector image to the vector image generator model 200 when a vector image is input to the vector image generator model 200. Since the label data is input together to the vector image generator model 200, the vector image generator model 200 may easily determine the relationship between augmented images.

Therefore, the vector image generator model training method of the inventive concepts may provide the highly reliable vector image generator model 200. For example, a vector image format database (DB) including the vector image generator model 200 may be provided. For example, the vector image generator model 200 may interpolate a plurality of vector image formats and generate a mixed vector image. For example, the vector image generator model 200 may generate images of various formats.

Figure 6:
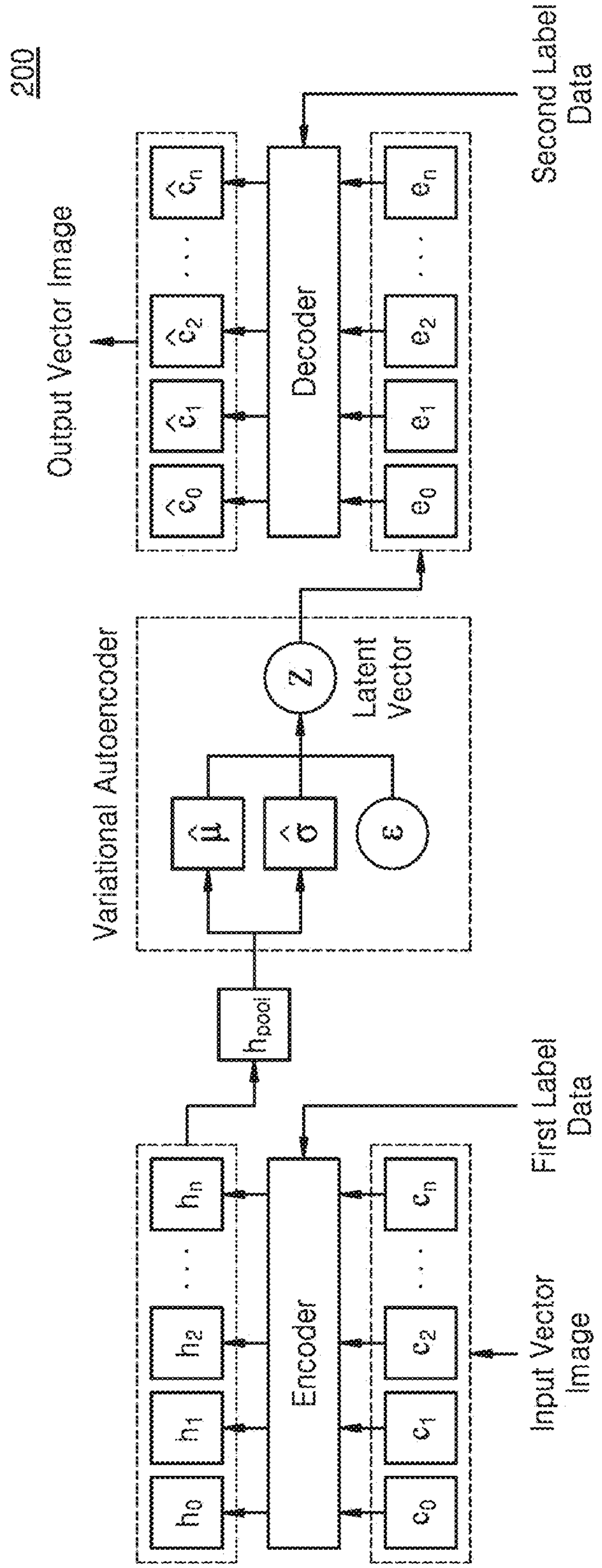
FIG. 6 is a conceptual diagram illustrating a vector image generator model according to at least one embodiment.
Figure 7:
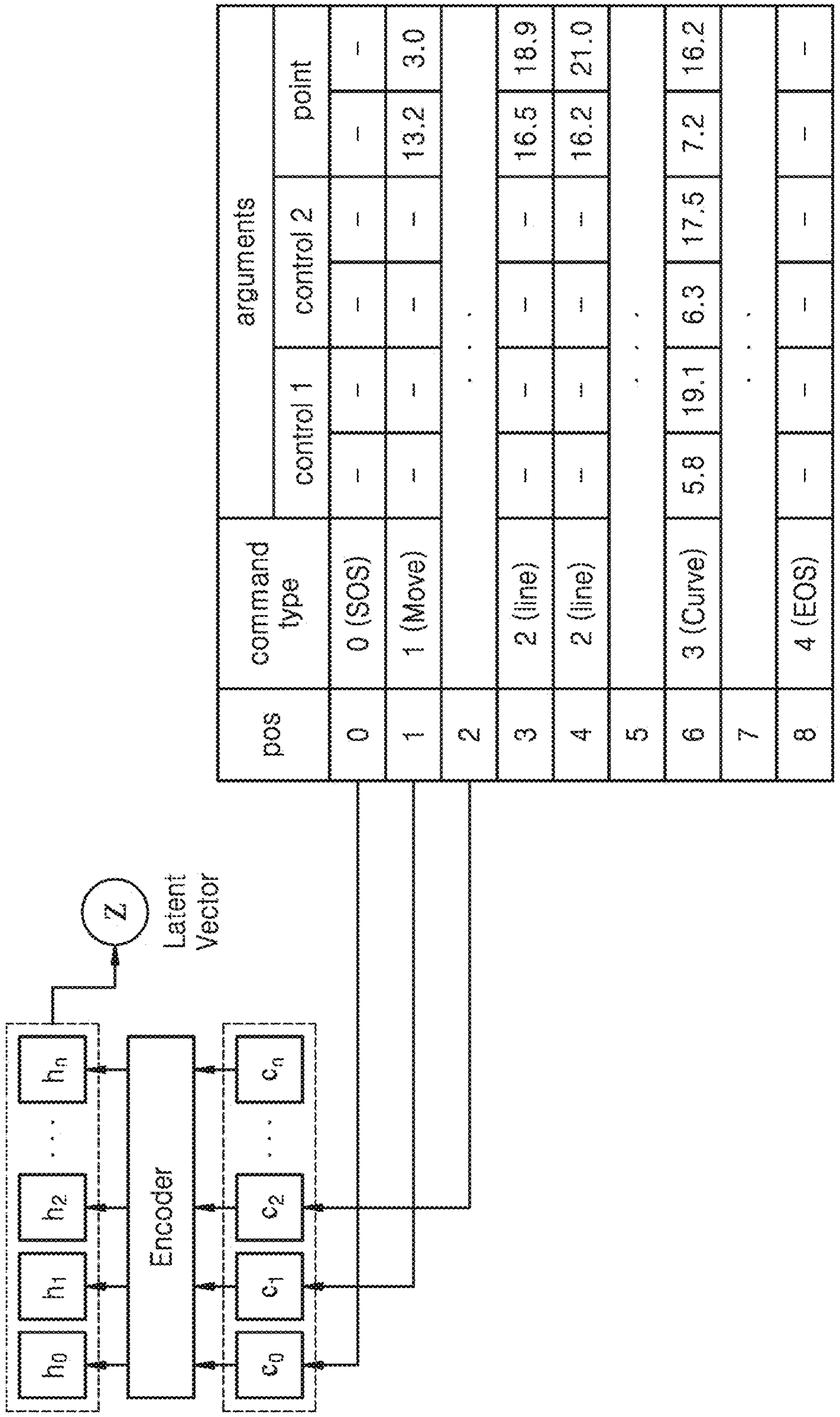
FIG. 7 is an enlarged conceptual diagram illustrating an encoder portion of FIG. 6.
Figure 8:
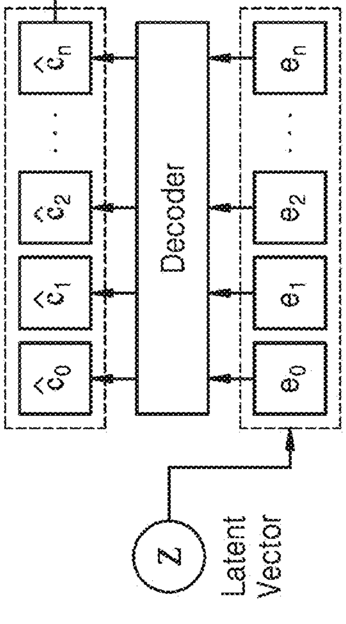
FIG. 8 is an enlarged conceptual diagram illustrating a decoder portion of FIG. 6.

FIG. 6 is a conceptual diagram illustrating a vector image generator model according to at least one embodiment. FIG. 7 is an enlarged conceptual diagram illustrating an encoder portion of FIG. 6, and FIG. 8 is an enlarged conceptual diagram illustrating a decoder portion of FIG. 6. A description is made with reference to FIGS. 1 to 5 together.

Referring to FIGS. 6 to 8, the vector image generator model 200 may include an encoder, a variational autoencoder, and a decoder. Here, the variational autoencoder may refer to a model configured to calculate a latent vector, based on an output value generated by the encoder. In at least one embodiment, the variational autoencoder may include an encoder and a decoder.

The vector image generator model 200 may transform input data into data having a lower dimension than the input data, and restore the input data, based on the transformed data. The encoder may transform input data into data having a lower dimension than the input data, and the decoder may restore the input data, based on the transformed data. The variational autoencoder may calculate a latent vector, based on the data transformed by the encoder. The latent vector may include data obtained by compressing the input data.

For example, the encoder may output a latent vector by using a downsampling operation such as convolution. Also, the decoder may receive the latent vector as an input and restore the input data by using an upsampling operation such as transposed convolution.

The encoder and/or the decoder may include a neural network model. For example, the encoder and/or the decoder may include a neural network model that is based on an artificial neural network (ANN), a convolution neural network (CNN), a region with convolution neural network (R-CNN), a region proposal network (RPN), a recurrent neural network (RNN), a generative adversarial network (GAN), a self-attention generative adversarial network (SA-GAN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, a plain residual network, a dense network, a hierarchical pyramid network, a transformer network, and/or a vision transformer network. For example, at least one of the encoder and/or the decoder may include a CNN including a plurality of convolution layers.

The encoder and the decoder may receive label data. The label data may include information about input data (e.g., an input image). For example, the information may include whether the input image is raw and/or a method of transforming the input image. According to at least one embodiment, regarding one piece of input data, label data input to the encoder may be the same as label data input to the decoder. According to another embodiment, regarding one piece of input data, label data input to the encoder may be different from label data input to the decoder. For example, the label data input to the encoder may be referred to as first label data, and the label data input to the decoder may be referred to as second label data.

Input vector data may be divided into a plurality of components and be input to the encoder. The plurality of components input to the encoder may be expressed as $c_0$ to $c_n$. The encoder may receive a vector image as an input, generate hidden layers $h_0$ to $h_n$, and generate $h_{pool}$ by combining the hidden layers $h_0$ to $h_n$. The encoder may also receive label data of input data.

The variational autoencoder may calculate a mean vector $\hat{\mu}$ and a standard deviation matrix $\hat{\sigma}$, based on the $h_{pool}$ generated by the encoder. Also, the variational autoencoder may calculate a latent vector z, based on the mean vector $\hat{\mu}$, the standard deviation matrix $\hat{\sigma}$, and a random variable ε. The random variable ε may include a random variable sampled from a standard normal distribution. For example, the variational autoencoder may calculate the latent vector z in Equation below:

$$z = \hat{\mu} + (\epsilon * \hat{\sigma}) \quad \text{[Equation]}$$

Here, the z represents the latent vector, the $\hat{\mu}$ represents the mean vector, the $\hat{\sigma}$ represents the standard deviation matrix, and the ε represents the random variable.

The latent vector z may be input to the decoder. The latent vector z may be divided into a plurality of components and be input to the decoder. The plurality of components input to the decoder may be expressed as $e_o$ to $e_n$. The decoder may also receive label data of input data. The decoder may receive the latent vector z as an input, generate the plurality of vector components $\hat{c}_0$ to $\hat{c}_n$, and restore the vector image.

As described above, the input vector image may include a raw image and/or an augmented image. The vector image generator model 200 may be configured to output the raw image regardless of the type of the input vector image. Accordingly, when the raw image and/or the augmented image are input to the vector image generator model 200, the vector image generator model 200 may be trained (or learned) so that the raw image is output from the vector image generator model 200. In this process, the latent vector of the vector image generator model 200 may be trained (or learned). Here, when the latent vector of the vector image generator model 200 is learned, the ability of the vector image generator model 200 to identify relationships between a plurality of augmented images may be improved.

The input vector image may include a position (pos), a type (type), and an argument (argument). The position may indicate the order of each argument of the input vector image. The type may indicate the type of each component of the input vector image. For example, the type may include a line, a move, and/or a curve. The line may include a straight line connecting a start point of a vector with an end point of the vector. The line may include the start point and the end point. When only the end point of the vector is given, the move may indicate a direction (cursor) moving toward the end point. The move may include the end point. The curve may include a non-linear path connecting the start point of the vector with the end point of the vector. The curve may include the start point, the end point, and a control point. The control point may include a parameter used to calculate a shape and trajectory of the curve. For example, the vector image of the inventive concepts may include a Bézier curve. The Bézier curve may include a plurality of control points. However, the inventive concepts are not limited to this, and the curve may include a single control point.

Also, the type may further include a closed path. The closed path may include a straight line connecting a start point with an end point, and a cursor moving from the end point to the start point. The closed path may include the start point and the end point.

The argument may include a parameter of each component of the input vector image. The argument may be different for each type of each component of the input vector image. As described above, the line may have the end point and the start point as arguments, the move may have the end point as an argument, and the curve may have the start point, the end point, and the control point as arguments.

Also, each component of the input vector image may have an order. A component located at the beginning of the input data may include a start of sequence (SOS), and a component located at the end of the input data may include an end of sequence (EOS). The SOS and the EOS may include no arguments.

FIGS. 7 and 8 illustrate as an example that the input vector image and the output vector image include nine components, but the example embodiments are not limited thereto. For example, the input vector image and the output vector image may include eight or fewer components, or may include ten or more components. Also, in FIGS. 7 and 8, the start point and the end point may be expressed as points as an example. Also, the number of components of the input vector image may be the same as the number of components of the output vector image.

The decoder may receive a latent vector z calculated by the variational autoencoder as an input. The decoder may calculate an output value, based on the latent vector z. The output vector image may also include a position (pos), a type (type), and an argument (argument). The descriptions of the position (pos), the type (type), and the argument (argument) have been described above and are omitted here.

As described above, output data output from the decoder may be configured to be the same as the raw input data. For example, when raw data is input to the vector image generator model 200, the raw data may be output from the decoder. That is, in this case, the raw data input to the vector image generator model 200 may be the same as the output raw data.

Also, when augmented input data is input to the vector image generator model 200, raw data may be output from the decoder. That is, in this case, the raw input data input to the vector image generator model 200 may be different from the output raw data.

Figure 9:
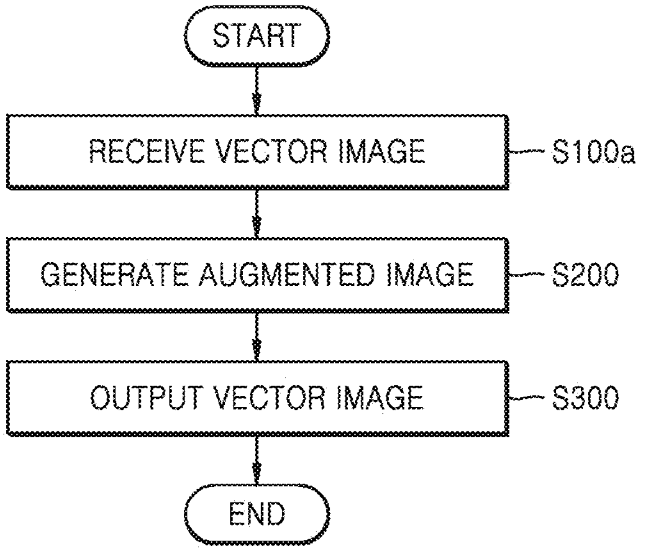
FIG. 9 is a flowchart illustrating a vector image generator model training method according to at least one embodiment.
Figure 10:
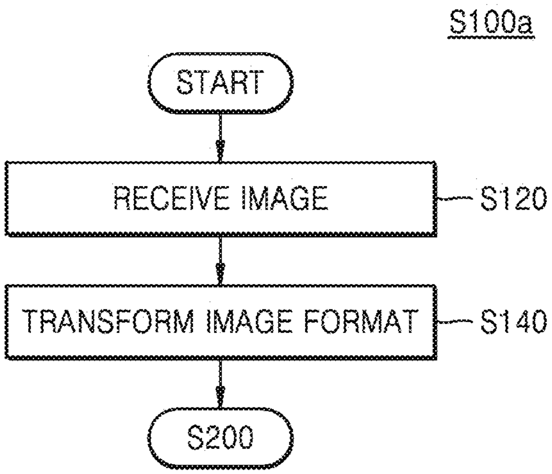
FIG. 10 is a flowchart illustrating a method of receiving a vector image, according to at least one embodiment.
Figure 11:
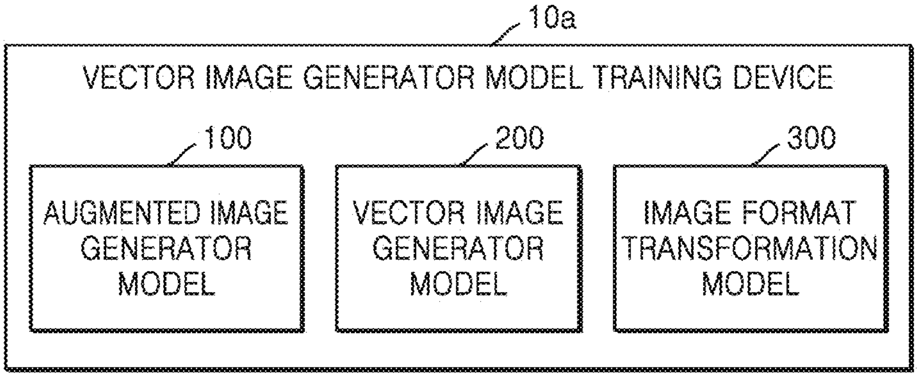
FIG. 11 is a schematic diagram illustrating a vector image generator model training device according to at least one embodiment.

FIG. 9 is a flowchart illustrating a vector image generator model training method according to at least one embodiment. FIG. 10 is a flowchart illustrating a method of receiving a vector image, according to at least one embodiment. FIG. 11 is a schematic diagram illustrating a vector image generator model training device according to at least one embodiment. A description is made with reference to FIGS. 1 and 2 together.

Referring to FIGS. 9 to 11, a vector image generator model training device 10*a* may include an augmented image generator model 100, a vector image generator model 200, and an image format transformation model 300. Since the augmented image generator model 100 and the vector image generator model 200 of the vector image generation training device 10*a* of FIG. 9 are the same as (or substantially similar to) the augmented image generator model 100 and the vector image generator model 200 of the vector image generator model training device 10 of FIG. 2, repeat descriptions may be omitted, and here, a description is made focusing on the image format transformation model 300.

In FIG. 11, the augmented image generator model 100, the vector image generator model 200, and the image format transformation model 300 are illustrated as separate models as examples, but according to at least one embodiment, the vector image generator model 200 is also possible to generate an augmented image and/or transform an image format. That is, the vector image generator model 200 may include the augmented image generator model 100 and/or the image format transformation model 300. In at least one embodiment, the augmented image generator model 100, the vector image generator model 200, and/or the image format transformation model 300 may include a plurality of models.

Also, the vector image generator model training method of FIG. 9 may include the operation S100*a* of receiving a vector image, the operation S200 of generating an augmented image, and the operation S300 of outputting the vector image. Since the operation S200 of generating the augmented image and the operation S300 of outputting the raw vector image of FIG. 9 are the same as (or substantially similar to) the operation S200 of generating the augmented image and the operation S300 of outputting the vector image of FIG. 1, here, a description is made focusing on the operation of receiving the vector image S100*a*.

The operation S100*a* of receiving the vector image of FIG. 9 may include the operation S120 of receiving an image and the operation S140 of changing a format of the image. For example, the operation S120 of receiving the image may include the operation of receiving an image of a vector image format and/or a raster graphics format. When the format of the image received in operation S120 is different from an image format for generating the augmented image and/or an image format for training the vector image generator model, the method may proceed to operation S140 and change the format of the image in operation S140.

The image format transformation model 300 may transform a format of an image. The image format transformation model 300 may transform a received image into a vector image. For example, the image format transformation model 300 may transform a raster graphics format image into a vector image format image. For example, the image format transformation model 300 may transform any vector image format into a different vector image format. For example, the image format transformation model 300 may transform a received image into an SVG format image. However, the technical idea of the inventive concepts is not limited to this, and it is undoubted that the image may be transformed into images of various vector image formats and be input to the vector image generator model 200.

Figure 12:
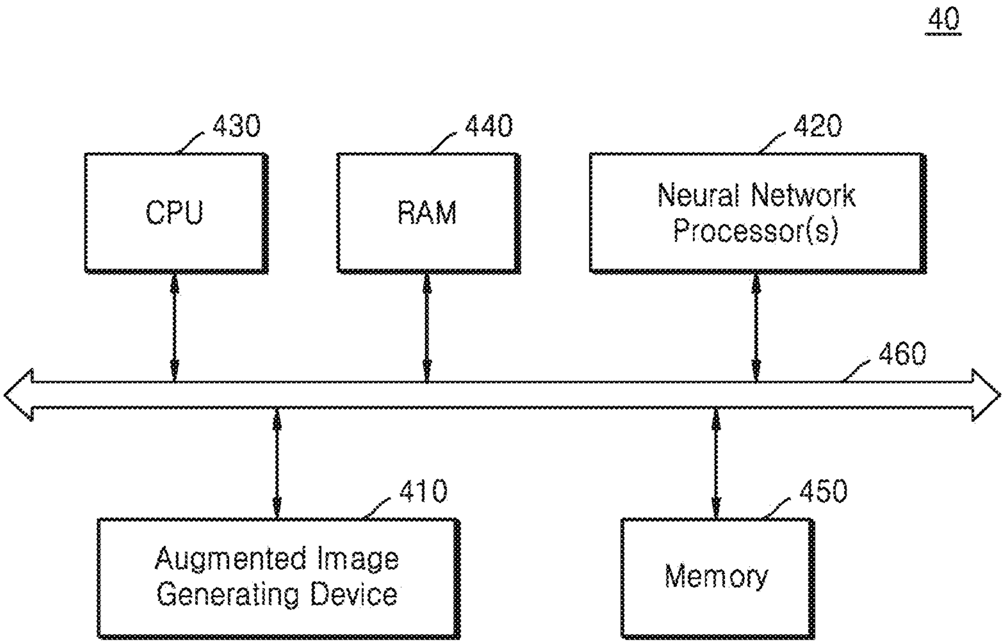
FIG. 12 is a block diagram illustrating a vector image generator model training device according to at least one embodiment.

FIG. 12 is a block diagram illustrating a vector image generator model training device according to at least one embodiment. A description is made with reference to FIGS. 1 to 11 together.

Referring to FIG. 12, a vector image generator model training device 40 may train a vector image generator model by using a neural network model. The vector image generator model training device 40 may train the vector image generator model 200 by using a deep learning network model. The vector image generator model training device 40 may include an augmented image generation device 410, a neural network processor 420, a central processing unit (CPU) 430, random access memory (RAM) 440, a memory 450, and a bus 460.

According to at least one embodiment, the vector image generator model training device 40 may further include other general-purpose components in addition to the components illustrated in FIG. 12. For example, the vector image generator model training device 40 may further include an input/output module, a security module, a power control device, etc., and may also further include various types of processors. Also, according to at least one embodiment, at least one of the components of FIG. 12 may be also omitted from the vector image generator model training device 40. The components of the vector image generator model training device 40 may communicate with each other through the bus 460.

The augmented image generating device 410 may be configured to transform a raw vector image and generate an augmented image. The augmented image generating device 410 may perform rotation transformation and/or symmetry transformation of the raw image. Also, the augmented image generating device 410 may perform translation transformation of the raw image, or may include enlarging and/or reducing the size of the raw image. Also, the augmented image generating device 410 may perform shear transformation of the raw image and generate the augmented image.

The neural network processor 420 may train (or learn) a neural network, or analyze input data by using the neural network, thereby inferring information included in the input data. The neural network processor 420 may make situation judgment or control the constructions of a mounted electronic device, based on the inferred information. For example, neural network processor 420 may be configured to perform text-to-speech, image recognition, image classification, and/or image processing using data received from the augmented image generating device 410 and/or the memory 450 as inputs into the neural network, and may be included in, e.g., a tablet device, a smart TV, an augmented reality (AR) device, an Internet of things (IoT) device, a self-driving vehicle, robots, a medical device, a drone, an advanced drivers assistance system (ADAS), an image display device, a data processing server, a measuring device, etc. and/or may be mounted in one of various kinds of electronic devices. The augmented image generating device 410 and/or the neural network may include, e.g., the vector image generator model training device 10 and/or 10*a* and/or may have been trained based on the self-supervised learning thereof. Thereby, for example, the augmented image generating device 410 may be configured to transform a raw vector image and generate an augmented image and the neural network may be configured to make judgements based on the output of the augmented image generating device 410.

For example, the neural network processor 420 may receive input data from the augmented image generating device 410 and the memory 450, and generate output data, based on the received input data. The neural network processor 420 may train the vector image generator model 200, based on the raw image and the augmented image.

In at least one embodiment, the vector image generator model training device 40 may further include an additional processor, and the processor may train the vector image generator model 200, based on the raw image and the augmented image.

The neural network processor 420 may be implemented as a neural network operation accelerator, a coprocessor, a digital signal processor (DSP), an application specific integrated circuit (ASIC), a field-programmable gate array (FPGA), a graphics processing unit (GPU), a neural processing unit (NPU), a tensor processing unit (TPU), a multi-processor system-on-chip (MPSoC), etc.

The neural network processor 420 may include a neural network model that is based on an artificial neural network (ANN), a convolution neural network (CNN), a region with convolution neural network (R-CNN), a region proposal network (RPN), a recurrent neural network (RNN), a generative adversarial network (GAN), a self-attention generative adversarial network (SAGAN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) Network, a classification network, a plain residual network, a dense network, a hierarchical pyramid network, a transformer network, and/or a vision transformer network. In addition, the type of the neural network model is not limited to the examples described above.

The CPU 430 may control the overall operation of the vector image generator model training device 40. The CPU 430 may include one processor core (single core), or include a plurality of processor cores (multi-core). By using the RAM 440, the CPU 430 may process or execute programs and/or data stored in a storage area such as the memory 450.

For example, the CPU 430 may execute an application, and control the neural network processor 420 to perform required neural network-based tasks in accordance with the execution of the application.

The memory 450 may store a vector image. The memory 450 may store a raw image and an augmented image. The memory 450 may include at least one of a volatile memory or a nonvolatile memory. The nonvolatile memory may include read only memory (ROM), programmable ROM (PROM), electrically programmable ROM (EPROM), electrically erasable and programmable ROM (EEPROM), flash memory, etc. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), etc. In at least one embodiment, the memory 450 may include at least one of a hard disk drive (HDD), a solid state drive (SSD), a compact flash (CF) card, a secure digital (SD) card, a micro secure digital (Micro-SD) card, a mini secure digital (Mini-SD) card, an extreme digital (xD) card, or a memory stick.

In the above description, functional blocks which are expressed by using the terms "unit", "device," "model", etc. may be implemented in the form of processing circuitry such as hardware, software, or a combination thereof, which is configured to perform a specific function. The processing circuitry, more specifically, may be included in (and/or enabled by), but is not limited to, a central processing unit (CPU), an arithmetic logic unit (ALU), a digital signal processor, a microcomputer, a field programmable gate array (FPGA), a System-on-Chip, (SoC), a programmable logic unit, a microprocessor, application-specific integrated circuit (ASIC), etc. and/or may include active and/or passive electrical components such as transistors, resistors, capacitors, etc., and/or electronic circuits including one or more of said components configured to perform and/or enable the function of the functional blocks.

So far, the inventive concepts have been described with reference to the embodiment shown in the drawings, but these are merely examples, and those skilled in the art will understand that various modifications and other equivalent embodiments are possible therefrom. Therefore, the true technical protection scope of the inventive concepts should be defined by the technical spirit of the attached claims.

While the inventive concepts have been particularly shown and described with reference to embodiments thereof, it will be understood that various changes in form and details may be made therein without departing from the spirit and scope of the following claims.

What is claimed is:

1. A training method for a vector image generator model, wherein the method is performed by a computing device, and wherein the method comprises:

obtaining a raw image having a vector format;

generating an augmented image having the vector format by transforming the raw image; and training the vector image generator model by adjusting parameters of the vector image generator model based on a latent representation generated from input data including at least one of the raw image or the augmented image, to cause the vector image generator model to:

output the raw image based on receiving the raw image as input, and output the raw image based on receiving the augmented image as input, wherein the vector image generator model comprises a neural network model.

2. The method of claim 1, wherein the transforming the raw image comprises performing at least one of a rotation transformation, a symmetry transformation, a size transformation, or a translation.

3. The method of claim 1, wherein adjusting the parameters of the vector image generator model comprises updating a latent vector of the vector image generator model.

4. The method of claim 1, wherein the vector image generator model is configured to receive, as input, an input vector comprising a plurality of vector components, and wherein the plurality of vector components comprise respective position elements, type elements, and argument elements.

5. The method of claim 1, wherein the vector image generator model comprises a variational autoencoder.

6. The method of claim 1, wherein the vector image generator model is trained in a self-supervised learning method.

7. A vector image generator model training method, wherein the method is performed by a computing device, and wherein the method comprises:

receiving an image;

transforming a format of the received image to generate a raw image that has a vector format;

transforming the raw image to generate an augmented image having the vector format; and training the vector image generator model by adjusting parameters of the vector image generator model based on a latent representation generated from input data including at least one of the raw image or the augmented image, to cause the vector image generator model to:

output the raw image based on receiving the raw image as input, and output the raw image based on receiving the augmented image as input, wherein the vector image generator model comprises a neural network model.

8. The method of claim 7, wherein the transforming the raw image comprises performing at least one of 90° rotation transformation, 180° rotation transformation, 270° rotation transformation, X-axis symmetry transformation, Y-axis symmetry transformation, a combination of X-axis symmetry transformation and 90° rotation transformation, a combination of X-axis symmetry transformation and 180° rotation transformation, a combination of X-axis symmetry transformation and 270° rotation transformation, a combination of Y-axis symmetry transformation and 90° rotation transformation, a combination of Y-axis symmetry transformation and 180° rotation transformation, or a combination of Y-axis symmetry transformation and 270° rotation transformation.

9. The method of claim 7, wherein the transforming the raw image comprises performing at least one of translation, size transformation, or shear transformation.

10. The method of claim 7, wherein the received image has a raster graphics format.

11. The method of claim 7, wherein the vector format is a scalable vector graphics (SVG) format.

12. The method of claim 7, wherein the vector image generator model comprises an encoder, a variational autoencoder, and a decoder.

13. The method of claim 12, wherein at least one of the encoder or the decoder comprises at least one of a recurrent neural network (RNN), a long short-term memory (LSTM) network, or a transformer network.

14. A vector image generator model training method, wherein the method is performed by a computer device, and wherein the method comprises:

obtaining a raw image having a vector format;

generating an augmented image having the vector format by transforming the raw image; and training the vector image generator model by adjusting parameters of the vector image generator model based on a latent representation generated from input data including at least one of the raw image or the augmented image, to cause the vector image generator model to:

output the raw image based on receiving the raw image as input, and output the raw image based on receiving the augmented image as input, wherein the training of the vector image generator model comprises inputting the input data to the vector image generator model, wherein the vector image generator model comprises a neural network model, and wherein the input data input to the vector image generator model is labeled with label data.

15. The method of claim 14, wherein the obtaining the raw image having the vector format comprises:

receiving an image; and transforming the received image into the raw image having the vector format.

16. The method of claim 14, wherein the label data indicates whether the input data comprises the raw image.

17. The method of claim 14, wherein the vector image generator model comprises an encoder and a decoder, and wherein the label data is input to each of the encoder and the decoder.

18. The method of claim 17, wherein the label data is input to the encoder and to the decoder, and wherein the label data input to the encoder is the same as the label data input to the decoder.

19. The method of claim 17, wherein the label data comprises first label data and second label data different from the first label data, wherein the first label data is input to the encoder, and wherein the second label data is input to the decoder.

20. The method of claim 14, wherein training the vector image generator model comprises applying in a self-supervised learning method.

* * * * *